US008681984B2

(12) United States Patent
Lee et al.

(10) Patent No.: US 8,681,984 B2
(45) Date of Patent: Mar. 25, 2014

(54) CONTEXT-AWARE BASED RFID PRIVACY CONTROL SYSTEM AND PERSONAL PRIVACY PROTECTION METHOD USING THE SAME

(75) Inventors: Byung-Gil Lee, Daejeon (KR); Ho Won Kim, Daejeon (KR); Kyo Il Chung, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 1087 days.

(21) Appl. No.: 12/142,016

(22) Filed: Jun. 19, 2008

(65) Prior Publication Data

US 2009/0115600 A1    May 7, 2009

(30) Foreign Application Priority Data

Nov. 6, 2007  (KR) .................. 10-2007-0112425

(51) Int. Cl.
*H04L 9/00*  (2006.01)

(52) U.S. Cl.
USPC ........ 380/258; 726/1; 726/3; 726/21; 705/57; 709/225; 709/227

(58) Field of Classification Search
USPC ....... 380/258; 726/1, 3, 21; 705/57; 709/225, 709/277
See application file for complete search history.

(56) References Cited

U.S. PATENT DOCUMENTS

| 7,450,010 | B1 * | 11/2008 | Gravelle et al. | 340/572.1 |
| 7,847,694 | B2 * | 12/2010 | Lee et al. | 340/572.1 |
| 2004/0221036 | A1 * | 11/2004 | Smith | 709/225 |
| 2005/0007236 | A1 * | 1/2005 | Lane et al. | 340/5.86 |
| 2005/0164633 | A1 * | 7/2005 | Linjama et al. | 455/41.2 |
| 2006/0064384 | A1 * | 3/2006 | Mehrotra et al. | 705/57 |
| 2007/0040654 | A1 | 2/2007 | Lee et al. | |
| 2007/0043872 | A1 * | 2/2007 | Pattan et al. | 709/227 |
| 2007/0046439 | A1 * | 3/2007 | Takaku et al. | 340/10.41 |
| 2007/0052525 | A1 * | 3/2007 | Quan et al. | 340/10.4 |
| 2007/0204329 | A1 * | 8/2007 | Peckover | 726/3 |
| 2008/0129447 | A1 * | 6/2008 | Choi et al. | 340/5.61 |
| 2008/0229384 | A1 * | 9/2008 | Hodgkinson et al. | 726/1 |
| 2009/0222914 | A1 * | 9/2009 | Ozawa | 726/21 |
| 2010/0073147 | A1 * | 3/2010 | Guajardo Merchan et al. | 340/10.51 |
| 2012/0092130 | A1 * | 4/2012 | Chung et al. | 340/10.1 |

FOREIGN PATENT DOCUMENTS

| KR | 1020070021877 A | 2/2007 |
| KR | 1020070093203 A | 9/2007 |

OTHER PUBLICATIONS

Ari Juels, et al; "Squealing Euros: Privacy Protection in RFID-Enabled Banknotes", R.N. Wright (Ed.): FC 2003, LNCS 2742, pp. 103-121, 2003.

* cited by examiner

*Primary Examiner* — Beemnet Dada
*Assistant Examiner* — Sayed Beheshti Shirazi
(74) *Attorney, Agent, or Firm* — Ladas & Parry LLP

(57) ABSTRACT

Disclosed are a Radio Frequency Identification (RFID) personal privacy control system and a personal privacy protection method using the same which may dynamically process a privacy level according to peripheral circumstances of an RFID tagged object and an owner of the object, thereby securely protecting personal information associated with the RFID tag. The RFID privacy control server, the RFID privacy control server includes a context-aware information collecting unit to collect at least one context-aware information about a user; a privacy level adjusting unit to adjust a privacy level of the user based on the collected context-aware information; and a privacy control unit to determine, according to the adjusted privacy level, whether access of an RFID reader to RFID tag information is allowed, the RFID tag information corresponding to an RFID tag associated with the user.

16 Claims, 7 Drawing Sheets

FIG. 4

| OBJECT CATEGORY INFO. \ PRIVACY LEVEL | LEVEL(1~3) | | | MIDDLE LEVEL(4~6) | | | LEVEL(1~3) | | |
|---|---|---|---|---|---|---|---|---|---|
| | 1 | 2 | 3 | 4 | 5 | 6 | 7 | 8 | 9 |
| OBJECT CATEGORY INFO. | ○ | ○ | ○ | ○ | ○ | ○ | ○ | ○ | × |
| OBJECT NAME INFO. | ○ | ○ | ○ | ○ | ○ | ○ | ○ | ○ | × |
| OBJECT CODE INFO. | ○ | ○ | ○ | ○ | ○ | ○ | ○ | × | × |
| OBJECT HISTORY INFO. | ○ | ○ | ○ | ○ | ○ | ○ | × | × | × |
| PRICE INFO. | ○ | ○ | ○ | ○ | ○ | × | × | × | × |
| DISTRIBUTION INFO. | ○ | ○ | ○ | ○ | × | × | × | × | × |
| OBJECT DESCRIPTION INFO. | ○ | ○ | ○ | × | × | × | × | × | × |
| OWNER ID INFO. | ○ | ○ | × | × | × | × | × | × | × |
| OWNER ACCOUNT INFO. | ○ | × | × | × | × | × | × | × | × |
| OWNER PERSONAL INFO. | ○ | × | × | × | × | × | × | × | × |

CONTEXT-AWARE BASED RFID PRIVACY CONTROL SYSTEM AND PERSONAL PRIVACY PROTECTION METHOD USING THE SAME

CROSS-REFERENCE TO RELATED APPLICATION

This application claims priority from Korean Patent Application No. 10-2007-0112425, filed on Nov. 6, 2007, in the Korean Intellectual Property Office, the entire disclosure of which is incorporated herein by reference.

BACKGROUND OF THE INVENTION

1. Field of the Invention

The present invention relates to a Radio Frequency Identification (RFID) personal privacy control system and a personal privacy protection method using the same, and more particularly, to an RFID personal privacy control system and a personal privacy protection method using the same which may dynamically process a privacy level according to surrounding circumstances of an RFID tagged object and an owner of the object, thereby securely protecting personal information associated with the RFID tag. The RFID tag according to the present invention may include a tag attached to an object capable of being personalized, a tag for identifying a user, and the like, and be applicable to all objects and fields dealing with personal privacy.

This work was supported by the IT R&D program of MIC/IITA. [2005-S-088-03, Development of Security Technology for Secure RFID/USN service]

2. Description of Related Art

In general, a Radio Frequency Identification (RFID) refers to technology which may contactlessly read or record information from a tag having an unique identification number using a radio frequency to thereby recognize, trace, and manage objects, animals, persons, and the like to which the tag is attached. For example, at the time of shipping products by a manufacturer after the RFID technology has been introduced in a distribution system, a worker may be instructed to load the product on a specific transportation vehicle using information of an RFID tag attached to the product. Also, at the time of delivering the product to a corresponding shop, a number of products being in stock or the product name in the corresponding shop may be quickly evaluated by recognizing the RFID tagged product, thereby enabling effective ordering of the product. Also, when the products are delivered to a corresponding consumer, malfunction of the product in use and a time when the malfunction occurs may be detected using the RFID tag, thereby timely providing personalized services such as informing about replacement of the product in advance. Also, the consumer may verify authenticity of the product using the RFID tag, and the manufacturer may verify a distribution process of the product, thereby significantly improving qualities of services.

Applications of the RFID tag have been gradually expanded such as continuously providing services even after the product has been sold, being used for identifying the user, and the like other than production and distribution of the product.

In this regard, in the case where the RFID tag is used for identifying the user, exposure of personal information of the user may occur through the RFID tag, which results in causing problems in privacy of individuals. Further, when the user carries one's own object, severe personal privacy infringement may occur through an illicit reader in radio environments, such as exposure of information on one's own object, illicit information retrieval, abuse of personal information, and the like.

In the conventional art, to overcome the above-described problems, a privacy protection framework design based on a profile is utilized for the purpose of protection of the privacy. More specifically, the privacy protection framework design may have a structure in which a user connects with a privacy server linked with an information server to thereby determine one's own privacy level.

FIG. 1 illustrates a structure of a conventional Radio Frequency Identification (RFID) service network for protection of privacy in a conventional art. In general, when a reader 102 recognizes a tag 101 and transmits a request for information, the tag 101 transmits tag identifications (IDs) of its own, and the reader 102 receives, from an RFID information server 104, tag information corresponding to the tag IDs via middleware 103. The RFID information server 104 may construct the tag information corresponding to the tag IDs in a database type, analyze the request for information received from the reader 102, and provide corresponding tag information via enterprise applications 105.

As an example for protection of privacy in the conventional RFID service network, the user may determine the privacy level, and also determine a third party capable of accessing to RFID tag information for each level, so that another third party having a different privacy level is prevented from accessing to the RFID tag information, thereby protecting the privacy. In this manner, since a protection degree of the privacy may vary according to a user's circumstance, the user is required to determine the privacy level each time connecting with the privacy protection framework. As a result, when the privacy level is not timely determined in accordance with the user's circumstance, access of another user to the RFID tag information is not able to be flexibly allowed depending on the circumstances.

For example, in the case of an ID tag identifying a patient, a doctor of another hospital other than an existing hospital where a medical treatment with respect to the patient has been performed is not allowed to access a personal treatment history of the patient due to protection of the privacy, which results in causing inconvenience in the medical treatment. Also, disadvantageously, all family members except one may be not allowed to access information about tagged home electronic appliances belonging to the one family member even in the same house. Also, at the time of one's own emergency, a lifeguard may not be allowed to access a treatment history of the individual due to the privacy level previously determined, and thus failing to administer a proper first aid treatment.

Therefore, a new RFID security system and method using the same according to the present invention which may securely protect personal information against infringement of the personal privacy while overcoming the above-described problems are disclosed. Specifically, the RFID security system and method using the same are disclosed, in which a control of the privacy may be more flexibly processed according to location and time in which a tagged object and an owner of the object are present.

SUMMARY OF THE INVENTION

An aspect of the present invention provides a Radio Frequency Identification (RFID) personal privacy control system and a personal privacy protection method using the same which may flexibly adjust a privacy level according to a user's circumstance, time, and location even without directly connecting with a system by the user to determine the privacy level, thereby providing object information (or RFID tag information) in accordance with a corresponding privacy level.

An aspect of the present invention provides an RFID personal privacy control system and a personal privacy protection method using the same which may prevent illicit exposure of information about an RFID tagged object and an owner of the object.

An aspect of the present invention provides an RFID personal privacy control system and a personal privacy protection method using the same which may transmit a processing result based on log and audit operations, thereby increasing reliability in security of the privacy.

An aspect of the present invention provides a RFID personal privacy control system and a personal privacy protection method using the same which may dynamically change and process an authorization for security services according to a user's circumstance, thereby providing various supplementary services.

According to an aspect of the present invention, there is provided a RFID privacy control server, which includes a context-aware information collecting unit to collect at least one context-aware information about a user; a privacy level adjusting unit to adjust a privacy level of the user based on the collected context-aware information; and a privacy control unit to determine, according to the adjusted privacy level, whether access of an RFID reader to RFID tag information is allowed, the RFID tag information corresponding to an RFID tag associated with the user.

According to an aspect of the present invention, there is provided an RFID information server based on context-awareness, which includes a context-aware information transmitting unit to transmit context-aware information collected from a context-aware sensor to an RFID privacy control server; a privacy level receiving unit to receive, from the RFID privacy control server, a privacy level adjusted according to the context-aware information; a security information generating unit to generate RFID tag information having been privacy-processed according to the adjusted privacy level; and a tag information transmitting unit to transmit the privacy-processed RFID tag information to a RFID reader.

According to an aspect of the present invention, there is provided an RFID personal privacy protecting method based on context-awareness, which includes collecting at least one context-aware information about a user, and classifying the collected information according to a predetermine criterion; estimating correlation between the classified context-aware information; adjusting a privacy level according to the context-aware information based on the estimated correlation; and determining, according to the adjusted privacy level, whether access of an RFID reader to RFID tag information is allowed, the RFID tag information corresponding to a RFID tag associated with the user.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 4 illustrates an example where a privacy level with respect to RFID tag information is determined according to an embodiment of the invention;

DETAILED DESCRIPTION OF EXEMPLARY EMBODIMENTS

Figure 1:
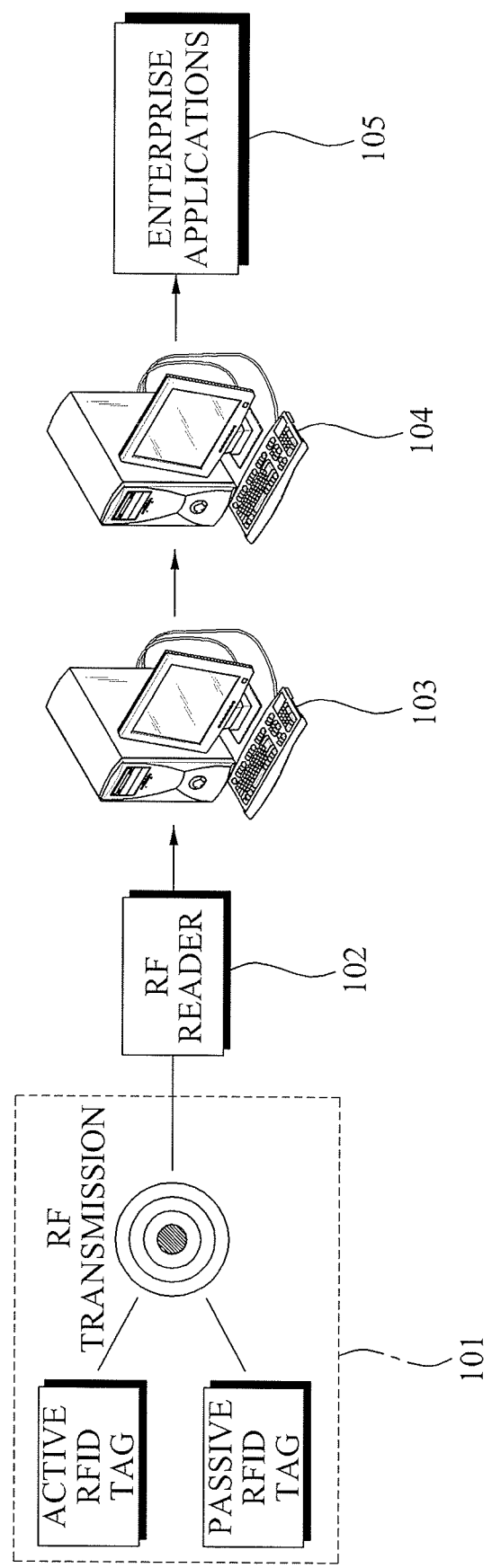
FIG. 1 illustrates a structure of a conventional Radio Frequency Identification (RFID) service network for protection of privacy according to a conventional art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
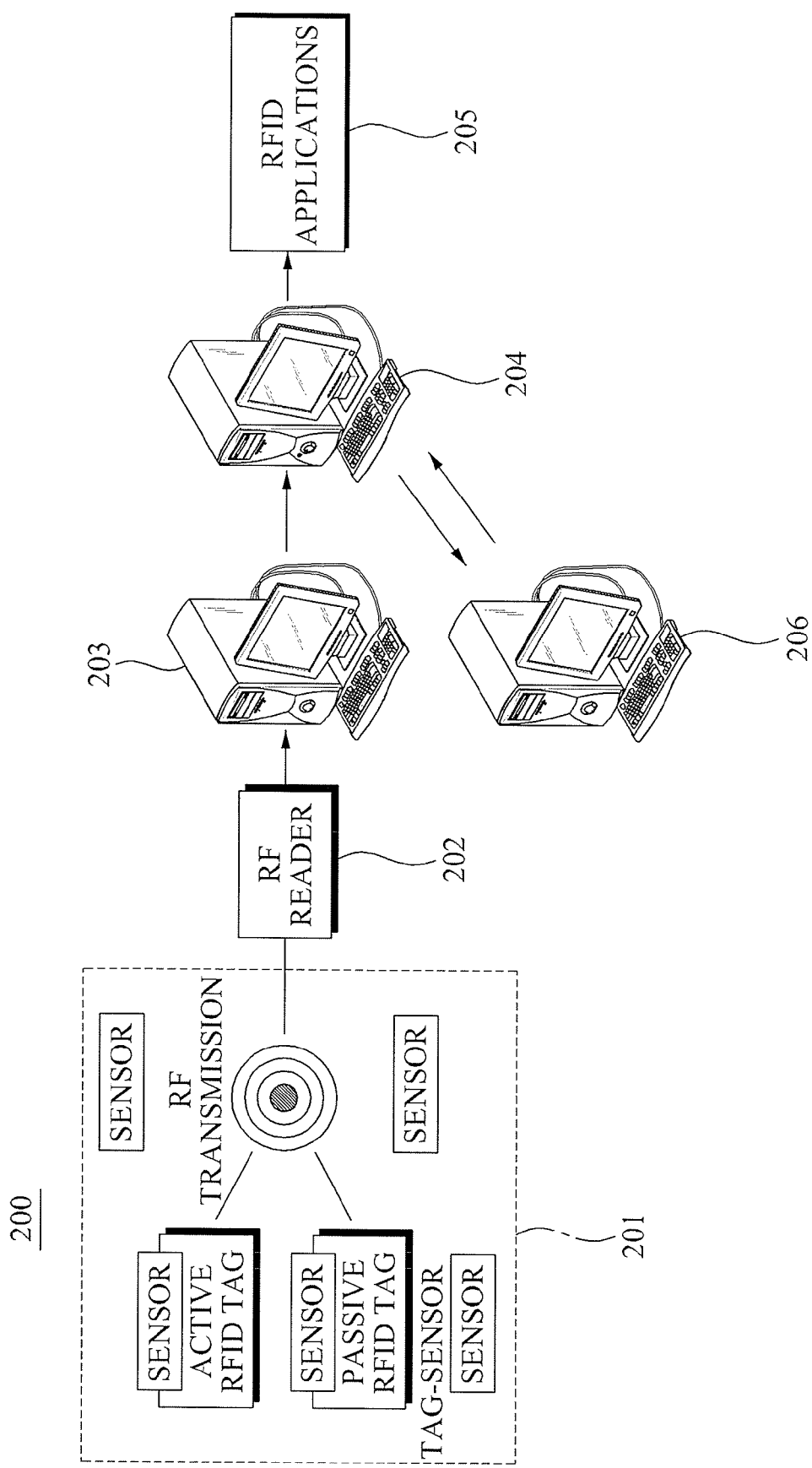
FIG. 2 illustrates a configuration of a network of a personal privacy protecting system based on a profile according to an embodiment of the invention.

FIG. 2 illustrates a configuration of a network of a personal privacy protecting system 200 based on a profile according to an embodiment of the invention.

As illustrated in FIG. 2, the privacy protecting system 200 according to the present embodiment of the invention includes a context-aware sensor 201, an RFID reader 202, an integrated middleware 203, an RFID information server 204, an RFID applications 205, and an RFID privacy control server 206.

The context-aware sensor 201 collects context-aware information about change in a tagged object and a user's circumstance. The collected context-aware information is transmitted to the RFID privacy control server 206, and the RFID reader 202 receives, from the RFID information server 204, RFID tag information to correspond to the context-aware information.

The RFID reader 202 according to the present embodiment of the invention may include a camera module for reading specified code information recorded in an RFID tag, a Code Division Multiplexing Access (CDMA) module, a Bluetooth module, an Infrared Data Association (IrDA) module, a radio communication module, and the like which are embedded therein. In FIG. 2, a Radio Frequency (RF) reader attached to a mobile terminal is illustrated.

The integrated middleware 203 may denote an EPC middleware which connects RFID information read in the RFID reader 202 and the RFID application 205, and may be embodied as an Application Level Event (ALE) RFID I/F and Sensor Event (SE) RFID I/F of an EPC network standard. The integrated middleware 203 may receive, from the RFID information server 204, tag information corresponding to the tag ID, and transmit the received tag information to the RFID reader 202.

The RFID information server 204 may transmit context-aware information received from the context-aware sensor 201 to the RFID privacy control server 206, and receive privacy level information with respect to the tag information to correspond to the context-aware information. The RFID information server 204 may transmit the tag information, in which the privacy level is determined to correspond to the received tag ID, to the RFID reader 202.

The RFID application 205 may provide applicable services using the received tag information.

The RFID privacy control server 206 may automatically determine and adjust the privacy level with respect to the tag information by estimating correlation between information about changes in a tagged object and a user's circumstance.

As illustrated in FIG. 2, the RFID information server 204 and the RFID privacy control server 206 are implemented as separate servers, respectively. According to another embodiment of the invention, the RFID information server 204 including the RFID privacy control server 206, that is, the RFID information server 204 in which functions of the RFID privacy control server are additionally implemented in a conventional RFID information server may be also applicable to the present invention, which will be appreciated by those skilled in the art.

Figure 3:
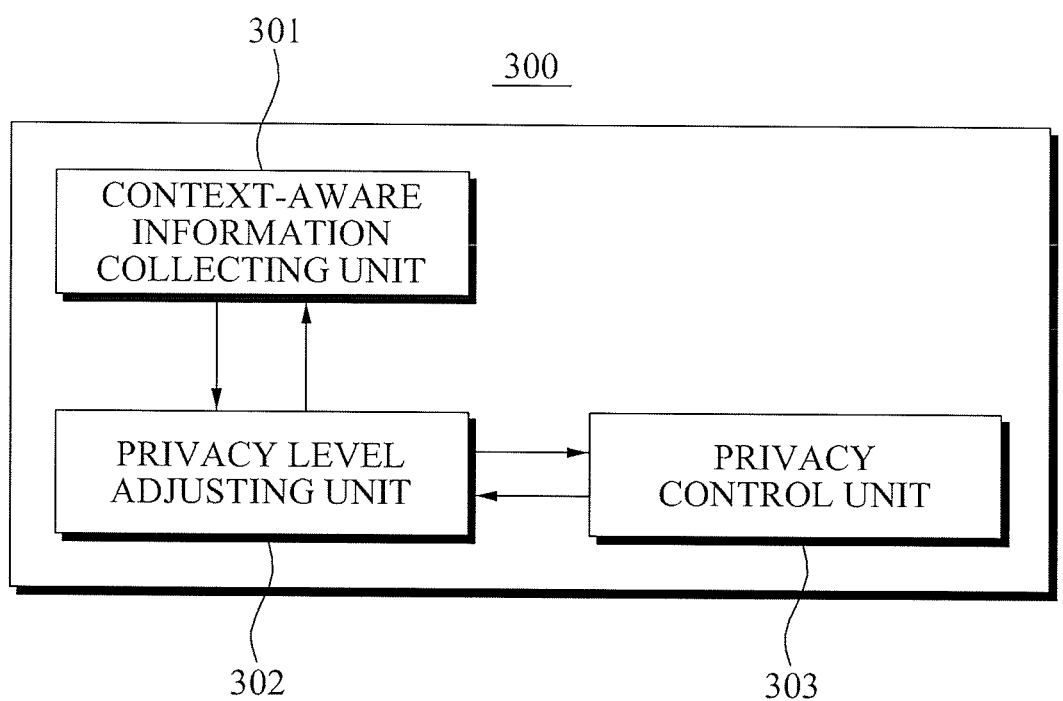
FIG. 3 illustrates an RFID personal privacy control server based on context-aware according to an embodiment of the invention.

FIG. 3 illustrates an RFID personal privacy control server based on context-aware according to an embodiment of the invention.

As illustrated in FIG. 3, the RFID privacy control server 300 according to the present embodiment of the invention includes a context-aware information collecting unit 301, a privacy level adjusting unit 302, and a privacy control unit 303.

The context-aware information collecting unit 301 collects at least one context-aware information about a user. According to the present embodiment of the invention, the context-aware information may be collected from a plurality of context-aware sensors positioned in a periphery of the user. As examples for the context-aware sensor, mechanical and electronic sensors may be given, and context-aware information associated with the user's circumstance may be automatically collected in various ways by the context-aware sensor. The context-aware information may include at least one of position information about the object or the user, time information, and state information.

As an example, the position information of the user may be determined using position information of a mobile terminal of the user. Specifically, state information associated with the user may be extracted according to a movement route and position of the mobile terminal of the user. Here, the state information may denote information indicating correlation between the object and the user with respect to an event generated as a context type, and the context-aware information may be determined based on the extracted state information.

According to another embodiment of the invention, the context-aware information may be directly inputted by the user using an input means which is different from the context-aware sensor. The user may directly input a state of the user's circumstance using the input means to thereby allow a server to accurately recognize the state of the user's circumstance. Various terminals connectable with the server via a communication network may be used as the input means.

The privacy level adjusting unit 302 adjusts a privacy level of the user based on the collected context-aware information. Specifically, the privacy level adjusting unit 302 classifies the context-aware information according to a predetermined criterion, and estimates correlation between the classified context-aware information to thereby adjust the privacy level. As an example, various correlation estimations (e.g., emergency state) with respect to context-aware information (e.g., position information) of the user or the related places (e.g., hospital, house, etc.), which are collected from the plurality of context-aware sensors to correspond to various given context information, may be extracted, and the privacy level based on the context-aware information may be determined and adjusted according to the extracted correlation estimations.

The privacy level may be identified by a privacy identifier including a level or type. As an example, the privacy identifier may include numerical information such as level 1, level 2, and the like, and also include type information which is appropriately determined according to applicable fields, locations, time, and the like such as type A (medical environment), type B (distribution management environment), type C (house) and the like.

According to the present embodiment of the invention, the privacy level may be differently determined for each information accessor wanting to acquire the RFID tag information. For this purpose, the privacy level may be stored in a privacy profile for each information accessor, and be able to be changed or expanded to correspond to the context-aware information. According to the present embodiment of the invention, the information accessor may be identified to correspond to an identifier of an RF reader. Specifically, in the case of a mobile RFID, when the RFID reader is embedded in a mobile terminal, an owner of the mobile terminal may be identified as the information accessor.

The privacy control unit 303 determines, according to the adjusted privacy level, whether access of the RFID reader to the RFID tag information is allowed. In this instance, the RFID tag information corresponds to an RFID tag associated with the user.

According to another embodiment of the invention, the privacy level may be individually determined to correspond to the RFID tag information being composed of a plurality of items. Also, when the access of the RFID reader to the RFID tag information is not allowed, the privacy control unit 303 may control the RFID information server to encrypt or delete the RFID tag information from the RFID tag, so that a privacy protection operation is performed against the information accessor which is not allowed to access the RFID tag information.

According to another embodiment of the invention, the RFID privacy control server 300 may further include a log audit processing unit (not shown).

In the case where the information accessor requests the RFID tag information in a predetermined circumstance, the log audit processing unit may determine to acquire an authorization of the user through a separate audit procedure.

As an example, the log audit processing unit may transmit a request for context information to the user, and the user may directly transmit context-aware information (second context-aware information) to the RFID privacy control server in response to the request, thereby realizing more accurate context-aware. The privacy level adjusting unit 302 may adjust the privacy level of the user based on the second context-aware information inputted by the user as well as the context-aware information received from the context-aware information collecting unit 301.

According to another embodiment of the invention, the user may transmit, to the RFID privacy control server, the second context-aware information used for directly intercepting, refusing, or allowing the access of the RFID reader to the RFID tag information, and the privacy control unit 303 may determine, according to the second context-aware information inputted by the user, whether the access of the RFID reader to the RFID tag information is allowed.

For the purpose of the transmission of the request for the context information, the log audit processing unit may transmit the request to the mobile terminal of the user using a short message service, so that the user can check the request in real time to thereby quickly respond to the second context-aware information.

According to another embodiment of the invention, when the response of the user for the request is absent for a predetermined time period, the privacy level adjusting unit 302 may regard this as a specific state stored in the privacy profile by the user, or an exceptional state and thereby may adjust the privacy level according to a predetermined criterion.

Hereinafter, a configuration in which the privacy level adjusting unit 302 and the privacy control unit 303 adjust the privacy level, respectively, and the access of the RFID reader to the RFID tag information is allowed according to the adjusted privacy level will be described in detail through more specific embodiments of the invention.

The user may differently determine the privacy level of the tagged object for each information accessor, in advance. Specifically, the privacy level such as an owner of the object (level 1), family members of the owner (level 2), a third party (level 10) may be determined, respectively. For example, when the user determines the privacy level of RFID tag information as '5' of an accessible privacy level, the third party (level 10) is not allowed to access the RFID tag information. However, disadvantageously, in the case of a nurse having '7' of the privacy level, the nurse is not allowed to access a personal treatment history recorded on a tag of a patient. For this reason, the privacy level provided to each information accessor may be adjusted by estimating correlation between the context-aware information (position, time and state information). As an example, the user may determine a specific place or position (e.g., house and patronized hospital) as a safe place, and thereby may additionally adjust the privacy level of the specific place or position within a range of a privacy level 2 (arbitrary number). Also, the user may additionally adjust the privacy level with respect to an exceptional state (e.g., accident, or medical treatment). Thus, when a visitor to the patient's house is identified as the nurse, the privacy level of the nurse is adjusted from '6' to '4' of the privacy level. Also, when the user may be determined to be currently in a medical treatment course through correlation estimation, the privacy level of the nurse is additionally adjusted from '4' to '2' of the privacy level based on the current state.

When the patient meets the nurse in another place which is different from the patient's house, the nurse having '4' of the privacy level may be allowed to access only medical-related information about the patient. Also, when the user, not as a patient, meets the nurse in another place which is different from the user's house, the nurse having '6' of the privacy level may be not allowed to directly access to the personal treatment history or personal information of the user due to the correlation estimation.

As described above, according to the present invention, the privacy level of the user may be dynamically controlled based on the context-aware of the user, and thus determining whether the access of the information accessor to the tag information is allowed.

FIG. 4 illustrates an example where a privacy level with respect to RFID tag information is determined according to an embodiment of the invention.

As illustrated in FIG. 4, the RFID tag information (or object information) may be composed of a plurality of items, and the privacy level may be individually determined for each item.

The RFID tag information being available according to the privacy level of the user may include object category information, object name information, object code information, object history information, price information, distribution information, object description information, owner ID information, owner account information, owner personal information.

As illustrated in FIG. 4, a privacy protection level having a relatively less significance may be determined such that access of all information accessors, ranging from '1' to '8' of the privacy level, to the object category information and the object name information is allowed. In this instance, each of the object category information and the object name information has a relatively less direct relativity with privacy of an individual.

Conversely, a privacy protection level having a relatively great significance may be determined such that access of only an information accessor having '1' of the privacy level to the owner account information and the owner personal information is allowed. In this instance, each of the owner account information and the owner personal information has a relatively great direct relativity with the privacy of the individual.

As described above, according to the present invention, the privacy level may be differently determined for each item of the RFID tag information, thereby realizing preferential and effective privacy protection based on characteristics of the RFID tag information.

Figure 5:
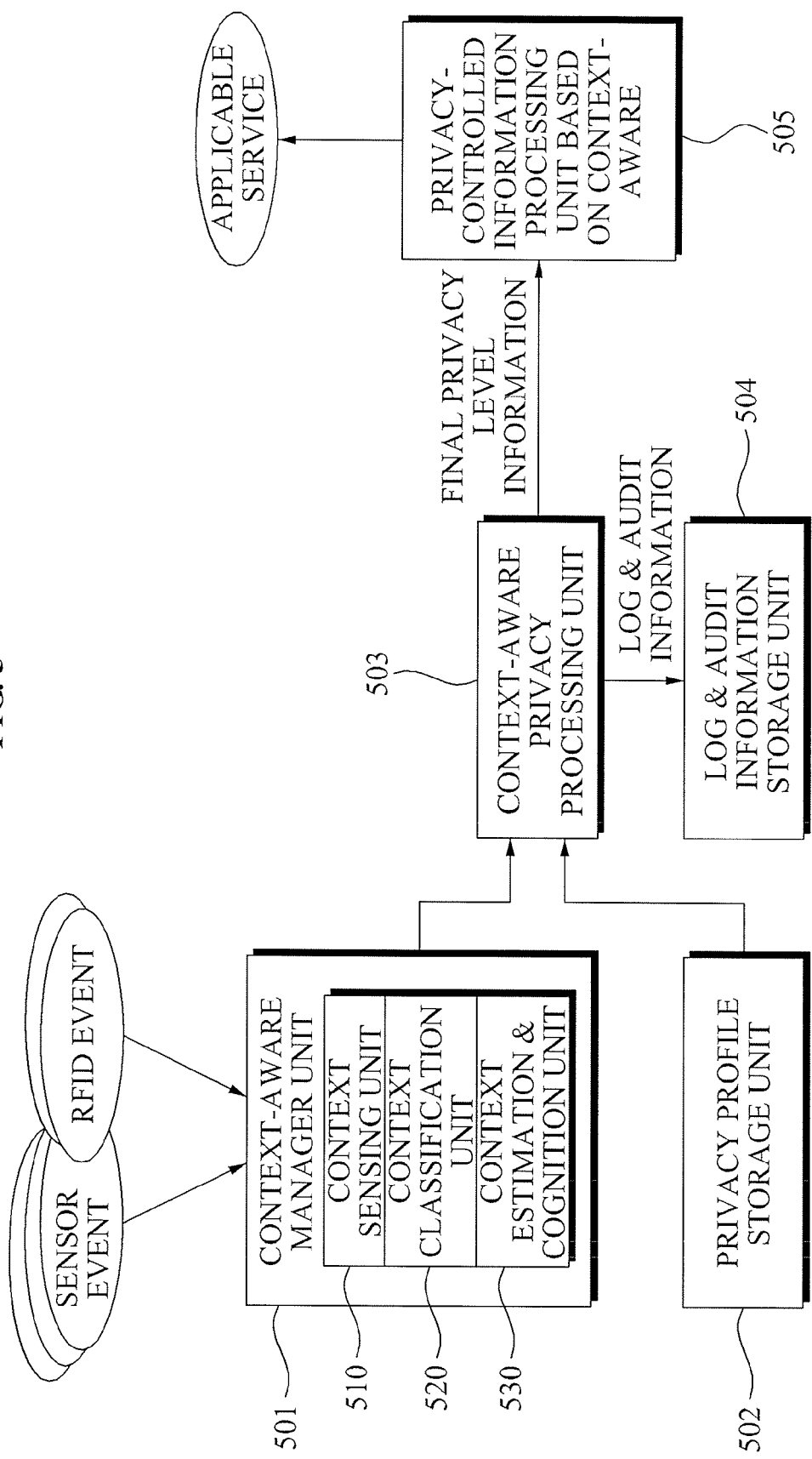
FIG. 5 illustrates a configuration of an RFID applicable service in which privacy is dynamically processed based on context-aware according to an embodiment of the invention.

FIG. 5 illustrates a configuration of an RFID applicable service in which privacy is dynamically processed based on context-aware according to an embodiment of the invention.

As illustrated in FIG. 5, a context sensing unit 510 (or context sensing unit) of a context-aware manager unit 501 senses event information (or context-aware information) received from a context-aware sensor and an RFID. A context classification unit 520 transmits, to a context estimation and cognition unit 530, context-aware information capable of being used in a virtual state in which the sensed context-aware information is filtered according to a predetermined rule. The context estimation and cognition unit 530 performs an operation for confirming a final state and state processing with respect to presence/absence of an abnormal state, and also performs a privacy processing with respect to the tag information.

According to the present embodiment of the invention, a range of the privacy level capable of being re-determined according to state information of the sensed RFID tag may vary according to applicable services and may be differently applied according to the state information. As an example, at the time of emergency, the privacy level of the tag information determined by the user may be lowered according to significance of the state information. For this purpose, the user may directly determine a personal privacy profile stored in an existing privacy profile as a default value, or a result derived from a privacy effect evaluation extracted from a specific applicable service may be determined as a default value of the privacy profile.

The privacy profile storage unit 502 stores privacy level information determined with respect to the tag information by the user. The privacy level may be determined by the user or an agent.

The context-aware privacy processing unit 503 estimates correlation between the sensed context-aware information and the profile of the user to thereby adjust and determine the privacy level with respect to the tag information. The context-aware privacy processing unit 503 transmits the privacy level to a reader according to a request of the reader, and stores a result of the transmitted privacy level in a log and audit information storage unit 504.

The log and audit information storage unit 504 stores and audits a processing result and a process with respect to whether the tag information is normally determined and processed within a range determined by the user, or whether abnormally received context information is re-determined.

As an example, in the case where an information accessor requests the tag information in a predetermined state, the log and audit information storage unit 504 may determine to allow the user to acquire an authorization of information use. Specifically, the log and audit information storage unit 504 may transmit a request for the context information to the mobile terminal of the user, and the user may check the request in real time to thereby determine approval or refusal of the information use. When a response of the user is absent for a predetermined time period, this may be regarded as a specific state stored in the privacy profile by the user, or an exceptional state, and thereby the privacy level is adjusted. Then, a record about the above-described series of processes for providing information is stored in the log and audit information storage unit 504. Thus, whether exposure of personal privacy information occurs through an abnormal route, or whether the personal privacy information is normally protected to correspond to the context-aware information may be stored, and thereby the stored information may be checked by an audit authority.

A privacy controlled-information processing unit 505 receives final privacy level information with respect to the tag information and provides the received information to the applicable service.

According to the present embodiment of the invention, the context-aware privacy processing unit 503 receives, from an existing privacy profile storage unit, static level information determined by the user, and combines the static level information and dynamic privacy information processed through context-aware. The context-aware privacy processing unit 503 verifies whether the combined result is applied within a privacy level range determined by the virtual user, and whether an accurate privacy processing is executed. Finally, the context-aware privacy processing unit 503 transmits the privacy level information with respect to the tag information to the RFID information server.

Figure 6:
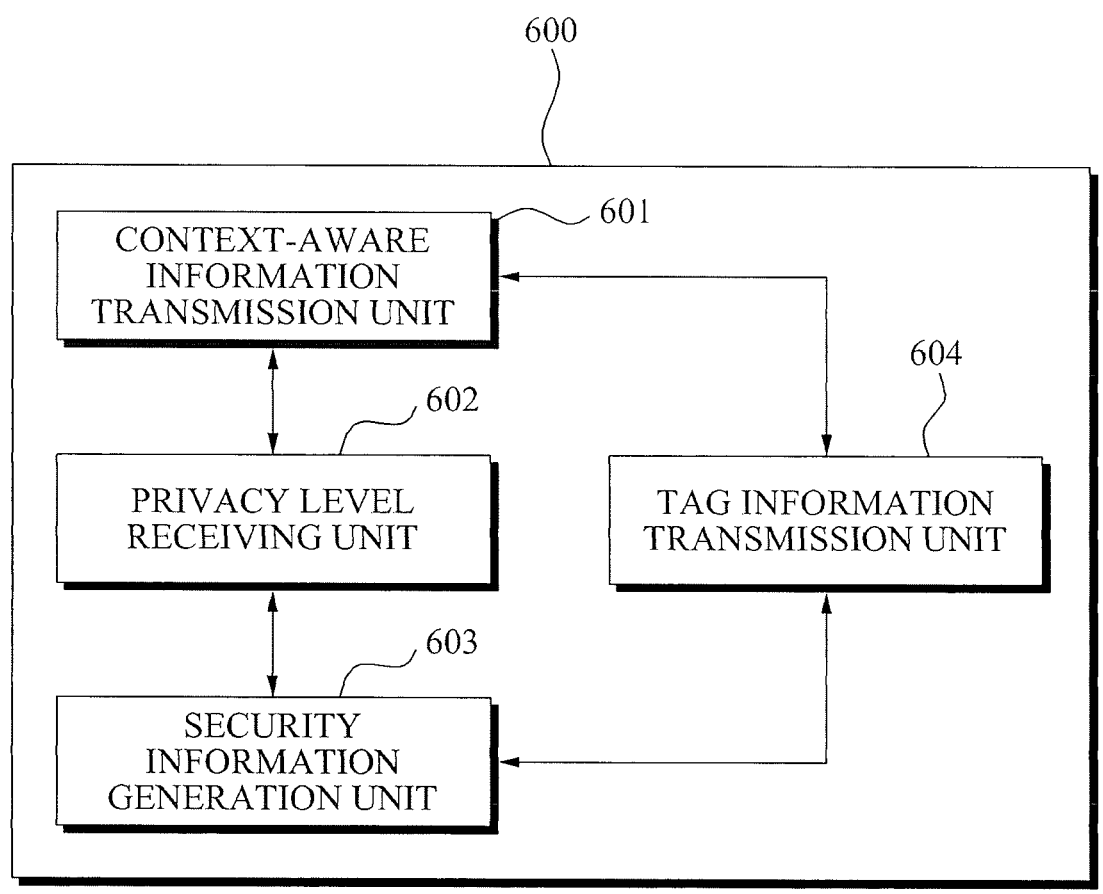
FIG. 6 illustrates an RFID information server according to an embodiment of the invention.

FIG. 6 illustrates an RFID information server according to an embodiment of the invention. The RFID information server according to the present embodiment of the invention serves to provide the RFID tag information in response to a request for information from the RF reader (information accessor) similarly to the conventional RFID information server in such a manner that a privacy processing is performed with respect to the RFID tag information according to the privacy level, and the privacy-processed RFID tag information is transmitted to the RF reader. Hereinafter, functions of the RFID information server will be described in detail with reference to FIG. 6.

As illustrated in FIG. 6, the RFID information server 600 according to the present embodiment of the invention includes a context-aware information transmitting unit 601, a privacy level receiving unit 602, a security information generating unit 603, and a tag information transmitting unit 604.

The context-aware information transmitting unit 601 transmits context-aware information collected from the context-aware sensor to the RFID privacy control server. The context-aware sensor collects context-aware information about change in the tagged object or the user's circumstance.

The privacy level receiving unit 602 receives, from the RFID privacy control server, the privacy level adjusted to correspond to the context-aware information. The RFID privacy control server may adjust the privacy level of the user determined for each information accessor or for each of a plurality of items based on the context-aware information, and transmit the adjusted privacy level to the privacy level receiving unit 602.

The security information generating unit 603 generates the privacy-processed RFID tag information to correspond to the adjusted privacy level. As an example, when access of the RFID reader to the RFID tag information is allowed due to the adjusted privacy level of the RFID reader, the security information generating unit 603 directly transmits, to the RF reader, the RFID tag information stored in a database to correspond to an original tag ID acting as the privacy-processed RFID tag information. Also, when the access of the RFID reader to the RFID tag information is not allowed due to the adjusted privacy level of the RFID reader, the security information generating unit 603 may encrypt or delete the RFID tag information to thereby generate the privacy-processed RFID tag information.

The tag information transmitting unit 604 transmits the privacy-processed RFID tag information to the RFID reader.

Figure 7:
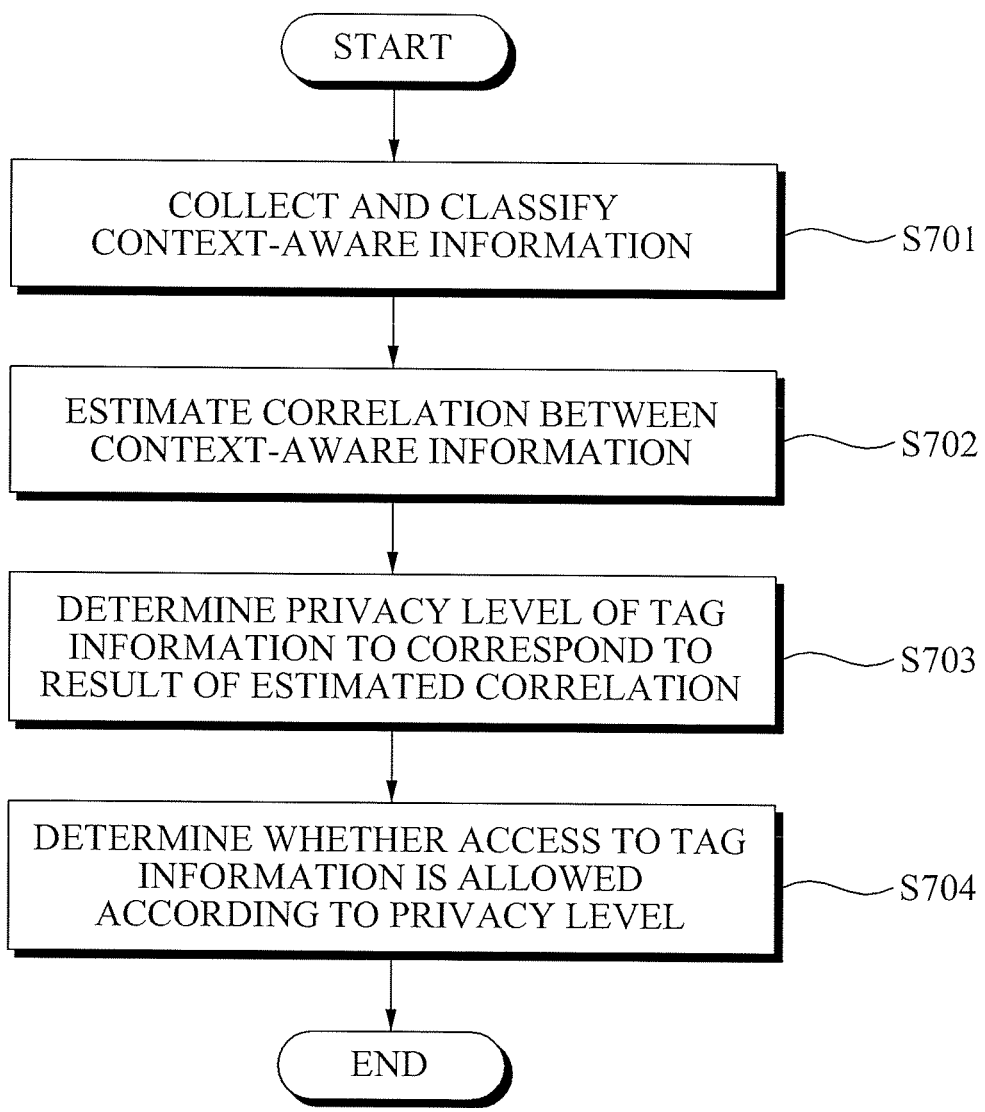
FIG. 7 illustrates an RFID personal privacy protecting method based on context-aware according to another embodiment of the invention.

FIG. 7 illustrates an RFID personal privacy protecting method based on context-aware according to another embodiment of the invention. Hereinafter, processes for each operation will be described in detail with reference to FIG. 7.

In operation S701, the RFID personal privacy protecting method collects at least one context-aware information about a user, and classifies the collected information according to a predetermined criterion. The context-aware information may be collected from a plurality of context-aware sensors positioned in a periphery of the user, or from a direct input of the user. The context-aware information may include at least one of position, time, and state information of an RFID tagged object or the user. As an example, the position information of the user may be determined using position information of the mobile terminal of the user.

In operation S702, the RFID personal privacy protecting method estimates correlation between the classified context-aware information. As an example, various correlation estimations (e.g., emergency state) with respect to virtual context-aware information (e.g., position information) of the user and the related places (e.g, hospital, house), which are collected from the plurality of context-aware sensors to correspond to various given context information, may be extracted.

In operation S703, the RFID personal privacy protecting method adjusts the privacy level with respect to the RFID tag information according to the extracted correlation estimation.

In operation S704, the RFID personal privacy protecting method determines whether access to RFID tag information is allowed according to the adjusted privacy level. In this instance, the RFID tag information corresponds to the RFID tag associated with the user. When access to information about the object is not allowed, the RFID personal privacy protecting method encrypts or deletes the RFID tag information.

Descriptions of the RFID personal privacy protecting method corresponding to descriptions given with respect to FIGS. 2 to 6 are herein omitted.

The RFID personal privacy protecting method according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, illicit exposure of information about a tagged object and an owner of the object may be prevented.

According to the present invention, a state of the user is recognized and the recognized state is automatically reflected in a privacy processing, thereby eliminating troublesome tasks in which the user is required to connect with a system according to respective states every time determining the privacy level.

According to the present invention, a processing result is transmitted to the user through a log and audit operation, thereby increasing reliability in privacy security of the user.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A Radio Frequency Identification (RFID) personal privacy control server, the RFID personal privacy control server comprising:
   a context-aware information collecting unit that collects at least one context-aware information about a user;
   a personal privacy level adjusting unit that adjusts a personal privacy level of the user based on the collected context-aware information; and
   a personal privacy control unit that determines, according to the adjusted personal privacy level, whether access of an RFID reader to RFID tag information is allowed, the RFID tag information corresponding to an RFID tag associated with the user,
   wherein the personal privacy level adjusting unit classifies the at least one context-away information according to a predetermined criterion, estimates correlation between the classified context-aware information, and adjusts the personal privacy levels based on the estimated correlation,
   a log audit processing unit that transmits a request for context information to the user, and receives, from a user, second context-aware information in response to the request;
   wherein the privacy level adjusting unit adjusts the privacy level of the user based on the second context-aware information inputted by the user and the context aware information received from the context aware information collecting unit, and wherein the personal privacy control unit determines whether the access of the RFID reader to the RFID tag information is allowed further based on the second context-aware information.

2. The RFID personal privacy control server of claim 1, wherein the context-aware information includes at least one of position information about an object or the user, time information, and state information.

3. The RFID personal privacy control server of claim 2, wherein the position information about the user is determined using position information about a mobile terminal of the user.

4. The RFID personal privacy control server of claim 1, wherein the RFID tag information is composed of a plurality of items, and the personal privacy level is individually determined for each of the plurality of items.

5. The RFID personal privacy control server of claim 1, wherein the personal privacy level is individually determined according to the RFID reader.

6. The RFID personal privacy control server of claim 1, wherein the log audit processing unit transmits the request to the mobile terminal of the user using a short message service.

7. The RFID personal privacy control server of claim 1, further comprising:
   a log audit processing unit that transmits a request for context information to the user,
      wherein the personal privacy control unit adjusts the personal privacy level of the user according to a predetermined criterion when a response of the user for the request is absent for a predetermined time period.

8. The RFID personal privacy control server of claim 1, wherein when the access of the RFID reader to the RFID tag information is disallowed, the personal privacy control unit either encrypts or deletes the RFID tag information from the RFID tag.

9. The RFID personal privacy control server of claim 1, wherein the privacy level is identified by a privacy identifier including a level or type.

10. The RFID personal privacy control server of claim 1, wherein the context-aware information is collected either from a plurality of context-aware sensors positioned in a periphery of the user or from an input of the user.

11. The RFID personal privacy control server of claim 1, wherein the personal privacy level is stored in a personal privacy profile for each information accessor, and is capable of being changed or expanded to correspond to the context-aware information.

12. A Radio Frequency Identification (RFID) information server based on context-awareness, the RFID information Server comprising:
   a context-aware information transmitting unit that transmits context-aware information collected from a context-aware sensor to an RFID personal privacy control server;
   a personal privacy level receiving unit that receives, from the RFID personal privacy control server, a personal privacy level adjusted according to the context-aware information;
   a security information generating unit that generates RFID tag information having been personal privacy processed according to the adjusted personal privacy level; a tag information transmitting unit that transmits the personal privacy-processed RFID tag information to the RFID reader; and
   a log audit processing unit that transmits a request for context information to the user, and receives, from a user, second context-aware information in response to the request;
   wherein the privacy level adjusting unit adjusts the privacy level of the user based on the second context-aware information inputted by the user and the context aware information received from the context aware information collecting unit, and wherein the personal privacy control unit determines whether the access of the RFID reader to the RFID tag information is allowed further based on the second context-aware information.

13. The RFID information server of claim 12, wherein the security information generating unit generates the personal privacy-processed RFID tag information by either encrypting or deleting the RFID tag information.

14. A non-transitory computer readable storage medium having processor executable instructions to:
   transmit a request for second context aware information to the user; receive, from a user, second context-aware information in response to the request;
   and classify the collected and received context aware information according to a predetermine criterion;
   estimate correlation between the classified context aware information; adjust a personal privacy level according to the estimated correlation between the second context-aware information inputted by the user and the context aware information collected about the user; and
   determine, according to the adjusted personal privacy level, whether access of an RFID reader to the RFID tag information is allowed, the RFID tag information corresponding to a RFID tag associated with the user.

15. The non-transitory computer readable storage medium of claim 14, wherein the context-aware information includes at least one of position information about the user, time information, and state information.

16. The non-transitory computer readable storage medium of claim 1, wherein the second context-aware information includes at least one of time information and state information.

* * * * *